United States Patent [19]

Landis

[11] Patent Number: 4,952,666

[45] Date of Patent: Aug. 28, 1990

[54] HEXAFLUOROISOPROPYLIDENE-CONTAINING POLYIMIDE OLIGOMERS AND POLYMERS

[75] Inventor: Abraham L. Landis, Northridge, Calif.

[73] Assignee: Hughes Aircraft Company, Los Angeles, Calif.

[21] Appl. No.: 190,961

[22] Filed: May 6, 1988

[51] Int. Cl.⁵ .................... C08G 69/42; C08G 75/00
[52] U.S. Cl. ................................. 528/222; 528/352
[58] Field of Search .............................. 528/222, 352

[56] References Cited

U.S. PATENT DOCUMENTS

| | | | |
|---|---|---|---|
| 3,356,648 | 12/1967 | Rogers | 528/353 |
| 3,845,018 | 10/1984 | Bilow et al. | 528/353 |
| 3,879,349 | 4/1975 | Bilow et al. | 528/353 |
| 4,654,223 | 3/1987 | Araps et al. | 528/353 |

OTHER PUBLICATIONS

"An Acetylenic-Terminated Fluorinated Polyimide, Properties and Applications", by D. J. Capo et al, pp. 710–721, National Starch & Chemical Corp., P.O. Box 6500, Bridgewater, N.J. 08807.

*Primary Examiner*—Morton Foelak
*Attorney, Agent, or Firm*—Mary E. Lachman; W. K. Denson-Low

[57] ABSTRACT

Polyimide polymers having a relatively low dielectric constant and good solvent resistance, are formed by polymerization of a polyimide oligomer having the formula

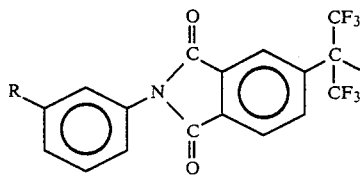

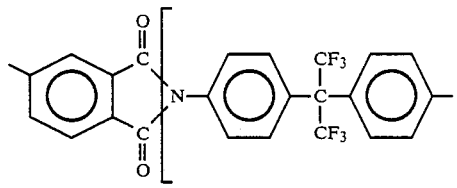

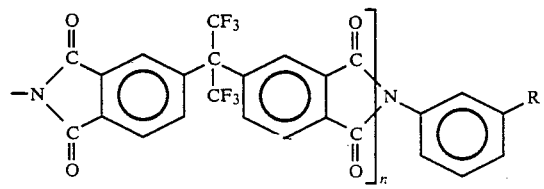

wherein R is selected from the group consisting of:
—C≡CH,
—CH=CH₂,
—CN, and

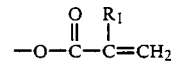

wherein $R_1$ is —H or —CH$_3$, and n=1-20.

Preferably R is an acetylene group. These polymers may also be formed from the corresponding polyamic acid oligomers.

These polymers are useful for forming dielectric layers, particularly in multilayer semiconductor devices.

11 Claims, No Drawings

HEXAFLUOROISOPROPYLIDENE-CONTAINING POLYIMIDE OLIGOMERS AND POLYMERS

BACKGROUND OF THE INVENTION

1. Field of the Invention

The present invention is directed to polyimide oligomers and polymers and, more particularly, to polyimide oligomers incorporating hexafluoroisopropylidene groups in the backbone thereof and being terminated at each end by a selected unsaturated group, to the corresponding polyamic acid oligomers, and to polymers of such oligomers.

2. Description of Related Art

Polymers formed from polyimide oligomers are well known in the art. U.S. Pat. No. 3,845,018, assigned to the present assignee, discloses a polyimide oligomer containing acetylene end groups, through which the oligomer cures by an addition reaction without the evolution of gas and the formation of unwanted voids in the cured polymer. This material is commercially available under the trade name THERMID®, from National Starch and Chemical Corporation. The polymers of this oligomer are described in U.S. Pat. No. 3,879,349, assigned to the present assignee. These oligomers and polymers contain poly(arylene ether) or poly(arylene thioether) groups in the backbone thereof. In the past, these polymers have been useful for forming high temperature resistant films and laminates. More recently, polyimide materials have been found useful in the fabrication of semiconductor devices as a dielectric layer to provide electrical insulation between adjacent conductive materials in multilayer structures. One such method for using these polyimide polymers is disclosed in U.S. Pat. No. 4,654,223 to Araps et al.

In order to improve the solubility of polyimides known in the early development of these materials, it was found desirable to incorporate hexafluoroisopropylidene groups in the polymer chain, as disclosed in U.S. Pat. No. 3,356,648 to Francis E. Rogers. In the method of Rogers, a tetracarboxylic acid anhydride containing a hexafluoroisopropylidene group is reacted with a hexafluoroisopropylidene bridged diamine in a solvent to form a polyamide-acid, which is then converted to the polyimide by heating and/or treatment with a dehydrating agent to produce cyclization. It is known in the art that incorporation of hexafluoroisopropylidene (6F) units into a polymer backbone structure assists in the processing of high temperature resistant aromatic heterocyclic polymer systems. These 6F units tend to lower the glass transition temperature (Tg) of polymers prepared therewith and thus improve their melt characteristics. In addition, 6F units within a polymer chain prohibit extensive conjugation of aromatic moieties, thereby providing good electric insulation characteristics for the end product resins. Such lack of conjugation also reduces UV-visible absorption, thus allowing end product polyimides to appear colorless and to resist photochemical degradation.

As noted above, the polymers of Rogers were developed to provide improved solubility and were contemplated for use as high-temperature resistant films and coatings, rather than in the fabrication of semiconductor devices. I have subsequently found that the polyimide of Rogers has a low dielectric constant (about 2.5) which is desirable for use as an interlevel insulator in a semiconductor device in order to reduce signal loss due to the capacitance effect. However, these polyimides were also found to have appreciable solubility in solvents such as acetone, glycol ethers, and dimethylacetamide. Consequently, for multiple layer applications, such as in integrated circuits and hybrid circuits, which require subsequent chemical processing after the polyimide layer has been formed, this polyimide may be difficult or impossible to use and can result in delamination of the final structure.

Thus, a need exists in the art for a polyimide polymer suitable for use as a dielectric layer in a multilayer semiconductor device, which has a low dielectric constant, and practical solvent resistance.

SUMMARY OF THE INVENTION

The general purpose of the present is to provide a new and improved polyimide polymer possessing a relatively low dielectric constant and relatively good solvent resistance and further to provide new oligomers from which these polymers may be formed. These polymers and oligomers possess most, if not all, of the advantages of the prior art compounds while overcoming their above-mentioned significant disadvantages.

The above-described general purpose of the present invention is accomplished by providing a new group of polyimide and polyamic acid oligomers incorporating hexafluoroisopropylidene groups in the backbone thereof and selected unsaturated terminal groups.

The polyimide oligomers of the present invention have the Formula I below.

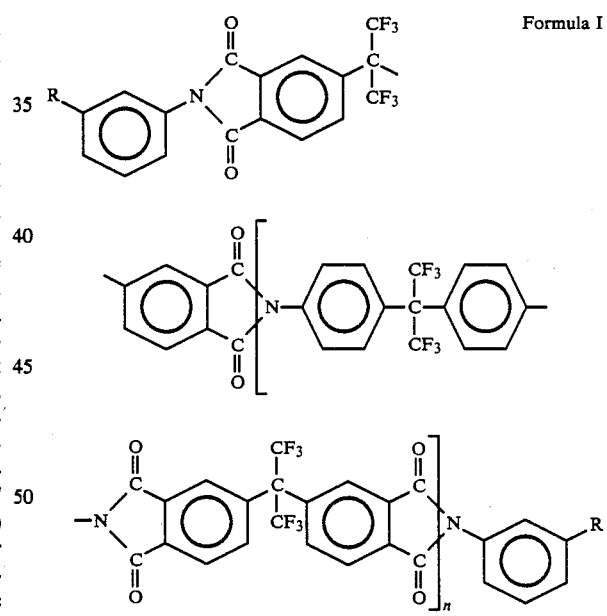

Formula I where R is selected from the group consisting of:
- —C≡CH,
- —CH=CH$_2$,
- —CN, and

where R$_1$ is —H or —CH$_3$, and n=1-20.

The polymers of the present invention are formed by polymerization of the polyimide oligomers of Formula I above.

Alternatively, the polymers of the present invention may be formed from the polyamic acid oligomers of Formula II below.

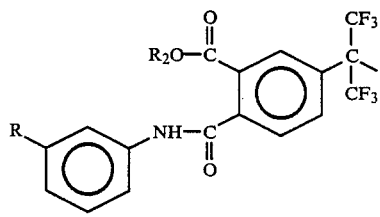 Formula II

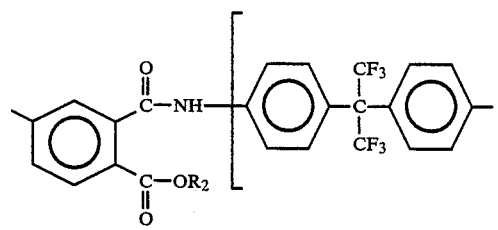

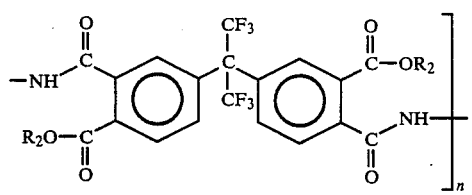

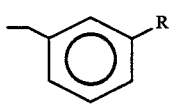

where R, $R_1$ and n are as defined above, $R_2$=—H or a lower alkyl group.

Accordingly, it is a purpose of the present invention to provide polyimide polymers suitable for use as dielectric layers in electronic devices, such as semiconductor devices, integrated circuits and hybrid circuits.

Another purpose of the present invention is to provide polyimide polymers suitable for use as interlevel dielectric layers in multilayer structures and circuits.

Yet another purpose is to provide polyimide polymers with a relatively low dielectric constant and good processing characteristics.

Another purpose is to provide polyimide polymers of the type described which have solvent properties which are practical for the above noted uses.

Still another purpose of the present invention is to provide a method forming the polyimide polymers described above.

A further purpose of the present invention is to provide oligomers from which the above-described polymers may be formed.

Another purpose of the present invention is to provide a method for forming the polyimide oligomers and polyamic acid oligomers described above.

The foregoing and other object, features, and advantages of the present invention will be apparent from the following more particular description of the preferred embodiments of the invention.

DESCRIPTION OF THE PREFERRED EMBODIMENTS

The polyimide oligomers in accordance with the present invention have Formula I below.

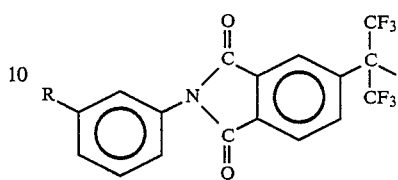 Formula I

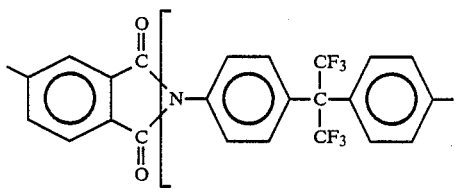

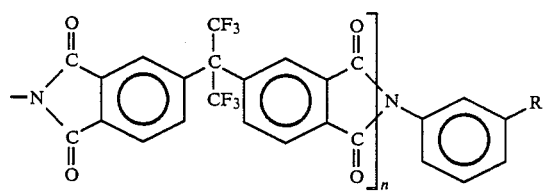

where R is selected from the group consisting of:
—C≡CH,
—CH=CH$_2$,
—CN, and

where $R_1$ is — or CH$_3$, and n=-20.

Alternatively, the amic acid precursor of the oligomer of Formula I may be used directly in accordance with the present invention to form polyimide polymers. These polyamic acid oligomers have Formula II below.

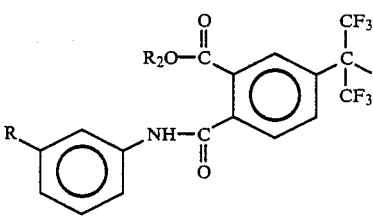 Formula II

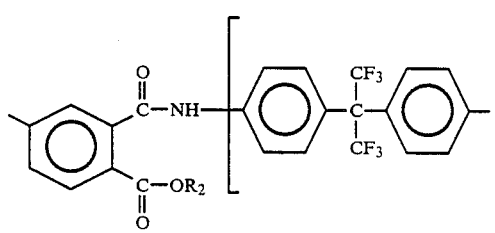

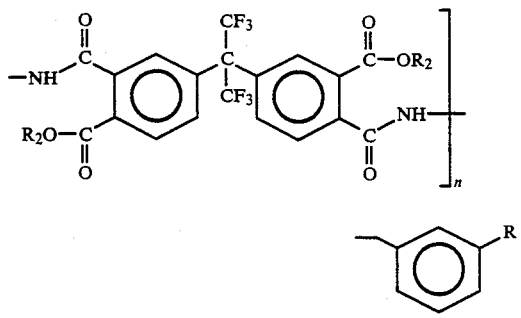

where R, $R_1$ and n are as defined above, $R_2=$ —H or a lower alkyl group. For ease of discussion, as used herein, the term "polyamic acid oligomer" is intended to include both the acid of Formula II where $R_2$ is —H and the corresponding acid ester of Formula II where $R_2$ is a lower alkyl group, such as a C1 to C4 alkyl group.

The value of "n" indicates the degree of polymerization, which may be within the range of 1 to 20, preferably within the range of about 3–11. It is noted that for n=1, the compound of Formula I or Formula II is a monomer rather than a oligomer. However, for the sake of simplicity, n=1 is intended to be included in the term "oligomer" as used herein. The value of n is chosen so that the polymer formed from the oligomer of Formula I or II exhibits good resistance to solvent attack as well as good planarization properties. For n greater than 20, the ability to withstand solvent resistance will be reduced. For low values of n, the lower viscosity of these materials affects the planarization properties. The value of n is chosen to provide the desired balance between these two properties. In addition, the mechanical and thermal properties of the polymer product can be tailored by appropriate choice of the value of n. For example, oligomers having a high value of n have a wider processing window and form a polymer product having a higher coefficient of thermal expansion and greater flexibility than oligomers with lower values of n.

Furthermore, it is also possible to achieve the desired balance between good solvent resistance and good planarization properties by using mixtures or blends of oligomers with different values of n. For example, an oligomer having n=1 or 2 and good solvent resistance can be mixed with an oligomer having n=20 and good planarization properties. When such a mixture is polymerized, as described below, an interpenetrating network is formed and has both good solvent resistance and good planarization. Similarly, blends of oligomers having different values of n may also be used to tailor the mechanical and thermal properties of the polymer product, as well as the processing characteristics of the oligomer.

The polyimide oligomers of the present invention are formed by first reacting a diamine containing a hexafluoroisopropylidene group (referred to herein as a "6F" group) with a 6F-containing carboxylic acid dianhydride. More specifically, 2,2-bis(4-aminophenyl)hexafluoropropane of Formula III is reacted with 2,2-bis(3,4-dicarboxyphenyl)hexafluoropropane dianhydride of Formula IV to form the adduct thereof, which is then reacted with an R-substituted aminophenyl compound of Formula V, as shown in Equation (1) below. Heat is applied to produce imidization to form the oligomer of Formula I.

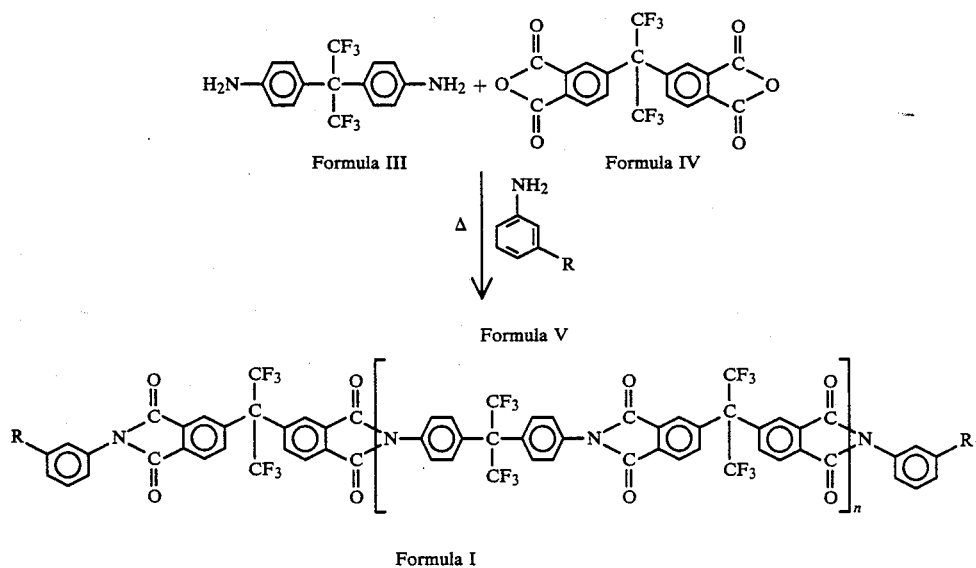

Equation (1)

Formula I where R is selected from the group consisting of:
—C≡CH,
—CH=$CH_2$,
—CN, and

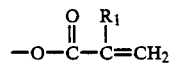

where $R_1$ is —H or —$CH_3$, and n=1–20.

The reaction is preferably carried out in a solvent such as N-methylpyrolidinone, N,N-dimethylacetamide, N,N-dimethylformamide, and other N,N-dialkylcarboxylamide compounds, or other solvents known in the art for such reactions.

The degree of polymerization "n" is controlled by controlling the proportion of the dianhydride and diamine reactants. For n=1 in Formula I, for each mole of dianhydride used, 0.5 mole of diamine, and 1.0 mole of monoamine (i.e. the R-substituted aminophenyl compound) are used. For n=10, for each mole of dianhydride used, 0.91 mole of diamine, and 0.18 mole of monoamine are used. The proportions of reactants may be determined for other values of n based on stoichiometric calculations. In addition, it will be appreciated that there is a tendency for the reaction to form mixtures, so that a product which contains predominantly an oligomer with n=1 would also contain oligomers with n=2, 3, or 4 and so on. A degree of polymerization of 10 is considered to provide the optimum balance between the desired low dielectric constant and the desired solvent-resistant properties.

In the R substituted aminophenyl compound, R is chosen to be a functional group as discussed below with regard to the polymers of the present invention. The aminophenyl compound is used in an amount sufficient to react with the unreacted anhydride functional end groups on the adduct formed by reacting the dianhydride and the diamine.

After addition of the aminophenyl compound, the reaction mixture is heated to about 150°-165° C. to produce cyclodehydration and imidization. Preferably the reaction mixture is heated at total reflux to remove water formed by the imidization process. The product is then purified and, for use as a coating, it is formed into a lacquer suitable for application to a substrate surface. For example, the compound of Formula I is dissolved in N,N-dimethylacetamide as a solvent to form a lacquer, which is spin coated onto a substrate by known methods. It should be noted that the polyimide compound of Formula I is very stable and can be stored for unlimited periods of time at room temperature.

The oligomer of Formula I is cured to form the polymer of the present invention by applying heat at about 250° C.±50° C. for about 15 to 60 minutes. During the polymerization process, the R-groups, such as acetylene, produce cross-linking of the polymer. It is this cross linking which is believed to give the polymers of the present invention their improved solvent resistance. Moreover, since these polymers are formed by an addition reaction without the release of gaseous by-products, void free films and structures are formed. The presence of voids would seriously degrade the electrical and mechanical properties of such films and structures. The polymers of the present invention avoid this problem.

In accordance with an alternative embodiment of the present invention, the compounds of Formulas III, IV and V are reacted as indicated in Equation (1) except that heat is not applied. The reaction is preferably carried out in the solvent which is required to form the lacquer for subsequent coating of the substrate. The product of this reaction is the polyamic acid oligomer of Formula II. The reaction mixture is concentrated to provide a solids content that will produce a good film, such as about 20% solids content. Optionally the oligomer of Formula II may be purified and then formed into a lacquer. If the oligomer of Formula II is not used immediately, is should be stored under cold conditions, not in excess of 60° C, to avoid its conversion to the polyimide polymer by cyclodehydration, which occurs slowly even at room temperature. The lacquer of the polyamic acid oligomer of Formula II is applied to the surface of a substrate as described above for the oligomers of Formula I. After a thin layer of lacquer of the polyamic acid oligomer of Formula II is applied to the substrate, such as by spin coating, heat is applied at about 250° ±50° C. for about 15 to 60 minutes. This heat produces cyclodehydration and imidization of the polyamic acid oligomer of Formula II to form the polyimide oligomer of Formula I, which immediately polymerizes as described above. As used hereafter with regard to the oligomer of Formula II, the term "polymerize" is intended to include both the imidization and the polymerization steps. Since the polyamic acid oligomer is applied to the substrate as a thin coating, the water produced by the imidization reaction can readily escape without the formation of voids. Because the polyamic acid oligomer has better solubility than the corresponding polyimide oligomer, it is sometimes advantageous to use the polyamic acid oligomer instead of the polyimide oligomer for certain applications in accordance with the present invention described below.

The polymers of the present invention have been found to be resistant to attack by acetone, N methyl pyrolidi none, and methylene chloride, which are strong solvents, and thus would also be resistant to other ordinary solvents. As previously noted, the polyimide polymers of U.S. Pat. No. 3,356,648, formed from compounds without the R substituted terminal groups, were found to be very soluble in acetone, glycol ethers, and dimethylacetamide. Due to their improved solvent resistance properties, the polymers of the present invention may be used as layers or coatings in a structure which must be subjected to further chemical processing after the polymer layer is formed, such as in integrated circuits, hybrid circuits, and semiconductor devices. As a particular example, the polymers of the present invention may be used to provide electrical insulation between successive stacked metal layers in a multilayer semiconductor device.

The dielectric constant of the polymers of the present invention was determined to be between about 2.4 and 2.7. These values are unexpectedly and desirably low as compared to the dielectric constant values of 2.8 to 3.0 for other 6F-substituted polyimides disclosed by D. J. Capo and J. E. Schoenberg in "An Acetylenic-Terminated Fluorinated Polyimide, Properties and Applications," in the Proceedings of SAMPE, October 1986 and the dielectric constant values of 3.0 to 3.7 for non-fluorinated polyimides as also disclosed by Capo and Schoenberg, previously referenced.

Because of their low dielectric constant and their improved solvent-resistant properties, the polymers of the present invention are especially well suited for forming dielectric interlayers in multilayer structures as previously described. However, it is not intended to limit the present polymers to this particular use, but rather to include any use, such as for a coating, film, laminate, composite, or structural element, where the improved solvent resistance and/or low dielectric constant properties of the present polymers may be used to advantage. For example, since the present polymers exhibit good adhesion to silicon substrates, they would be expected to exhibit good adhesion to silicon carbide or graphite fibers in order to form composites. Because of the low dielectric constant of the present polymers, such composites would exhibit a reduced dielectric constant. These composites are useful for forming structural composites, such as for aircraft.

Examples of practice of the present invention are as follows.

EXAMPLE 1

This example illustrates the preparation of the polyimide oligomer of the present invention having Formula I where R is an acetylene group and n is 10.

A 500 ml round-bottom, three-necked flask was fitted with a magnetic stirrer, $N_2$ addition at constant pressure, thermometer and pressure equalization dropping funnel. The flask was charged with 2,2-bis(3,4-dicarboxyphenyl)hexafluoropropane dianhydride (18.13g, 0.04083 mole) obtained from American Hoechst, recrystallized from acetic anhydride, and N-methylpyrolidinone (NMP) (100ml, distilled under vacuum from $P_2O_5$) To the solution at ambient temperature, a solution of 2,2 bis(4-aminophenyl)hexafluoropropane (15.00g, 0.04491 mole), used as received from American Hoechst, in 50ml of NMP (distilled from $P_2O_5$ under vacuum) was added dropwise over a 20 minute period under nitrogen. The temperature rose from 30° C. to 36° C., a 6° C. exotherm. The solution was stirred for 20 minutes and 3-aminophenylacetylene (1.051g, 0.008982 mole) was added all at once. About 15 ml of dry NMP was used to wash out any residual 3-aminophenyl acetylene and added to the reaction mixture. Then enough toluene was added so that the pot temperature would be 150° –154° C. during reflux. The pressure equalization dropping funnel was replaced with a Dean-Stark trap and a reflux condenser, and the solution was heated at total reflux to remove the water formed by the imidization process. The reaction mixture was then allowed to stand at ambient temperature under nitrogen for 2 days. The solvent was then stripped on a rotary film evaporator until the total weight of the product was 69g (46g solid content). Then 15ml of toluene was added to give a solid content of 38 weight percent. The product was filtered through #5 filter paper in a Buchner funnel. The product showed a melt flow at about 170° C. and cured above 200° C.

EXAMPLE 2

This example illustrates the preparation of the polymer of the present invention from the polyimide oligomer of Formula I where R is an acetylene group and n is 10, and the formation of a coating of this polymer.

A lacquer was formed by dissolving 4g of the oligomer prepared as described in Example 1 in 10ml toluene. The lacquer was spin coated on a 3 inch (7.62cm) glass slide, at 2000 revolutions per minute (RPM) for 1 minute. The coating, which became translucent was placed in an oven at 90° C. -100° C. The coating clarified, but, when dry, broke up on the surface.

A small amount of the lacquer was triturated with absolute isopropanol; and the light tan polymer was dried at 100° C. in an oven and 2g of the polymer were dissolved in 4ml of dry 99%+ dimethylacetamide (obtained from Aldrich, special high purity). A film was spin coated on a 3 inch glass slide, 2000 RPM for 1 minute. The coating which was slightly translucent was placed in an oven at 100° C. for about 30 minutes. The coating was intact. The slide was then heated up to 300° C. and kept at 300° C. for 30 minutes to cure the polymer. The resultant coating could be lifted off the slide by soaking in hot water. The film was relatively soft. The film was not attacked by acetone.

The rest of the original lacquer was triturated with about 500ml of isopropanol, washed with isopropanol, finally with methanol and dried overnight at 95° C. in a shallow crystallizing dish. The light tan polymers had a weight of 15g. A solution of 12g of this polymer was made in pure N,N-dimethyl acetamide to a solid content of about 35% and was filtered. This lacquer was used to spin coat films at 2000 RPM. Although initially opaque, the film soon became transparent when placed in the oven at 100° C. The film was then cured up to 300° C. to yield a tough coating.

EXAMPLE 3

This example illustrates an alternative method for the preparation of the polyimide oligomer of the present invention having Formula I where R is an acetylene group and n is 10.

The general procedure described in Example 1 was followed except that ultrapure N,N-dimethyl acetamide was used as the reaction solvent, along with a lower imidization reaction temperature. A 500ml three necked flask was fitted with a magnetic stirrer, thermometer, pressure equalization addition funnel and constant pressure nitrogen inlet. The flask was charged with 2,2-bis(3,4-dicarboxyphenyl)hexafluoropropane dianhydride (18.13g, 0.04083 mole), obtained from American Hoechst, recrystallized from acetic anhydride and N,N-dimethylacetamide (DMAC) (100ml, high purity). At ambient temperature, a solution of 2,2 bis(4 aminophenyl)hexafluoropropane (15.00g, 0.04491 mole), obtained from American Hoechst, in N,N dimethylacetamide (50ml, high purity) was added dropwise over a 45-minute period. Then a solution of 3-aminophenylacetylene (1.051g, 0.008982 mole) in DMAC (5ml, high purity) was added all at once. The $N_2$ inlet port was then replaced with a Dean Stark trap, condenser and a $N_2$ inlet port on top of the condenser. Toluene (75ml) was added and the reaction mixture was heated for four hours at total reflux with a pot temperature of 137° C. A total of 40 ml of water was present in the top layer based on the volume of the lower layer. It should be noted that this may not all be water, but a partition of (water and DMAC) and toluene. The solution was stored at room temperature under $N_2$ overnight. The solvent was then stripped on a rotary film evaporator until the total weight was 61.5g, which represented a solids content of 54 weight percent. This lacquer was somewhat too viscous to spin out satisfactory spin coated films on 3 inch glass circles, and was treated further as described in Example 4.

EXAMPLE 4

This example illustrates the use of the polyimide oligomer of Example 3 to form polymer coatings.

A portion of the lacquer from Example 3 (19.26g, containing 10.4g of solids) was diluted with 12.2g of N,N-dimethylacetamide to give a total weight of 3.15g or a solids content of 33%. This lacquer could be spin coated at 2000 RPM for 1 minute, cured by heating at 100° C. for 1 minute and 300° C. for about 30 minutes. A portion of this lacquer (8.74g or 4.72g solids) was diluted with 2.50g of DMAC to give a lacquer with a solid content of 42 weight percent. This latter lacquer could be spin coated at 4000 RPM. This high speed produced a better looking coating than at 2000 RPM.

EXAMPLE 5

This example illustrates the preparation of the polyimide oligomer of the present invention having Formula I where R is acetylene and n is 5.

The general procedure described in Example 1 was followed except that the molar proportions of the reactants was adjusted to provide the oligomer having n equal to 5 (namely, for each mole of dianhydride, 0.83 mole of diamine, and 0.33 mole of monoamine). The product showed a melt flow at about 170° C. and cured above 200° C. The infrared spectrum of the product was consistent with the proposed structure, and showed both imide functions and the presence of carbon-fluorine bonds. This material had a melting point of 200°–210° C.

EXAMPLE 6

This example illustrates the preparation of the polyimide oligomer of the present invention having Formula I where R is acetylene and n is 1.

The general procedure described in Example 1 was followed except that the molar proportions of the reactants were adjusted to use for each mole of dianhydride, 0.5 mole of diamine, and 1.0 mole of monoamine. The product had a melting point of 160°–170° C.

EXAMPLE 7

This example illustrates the preparation of the polyamic acid oligomer of the present invention having Formula II where R is acetylene and n is 10.

The general procedure described in Example 1 is followed except that after the 3-aminophenylacetylene is added, no additional heat is applied and the reaction mixture is not refluxed. The reaction is carried out in the solvent which is desired for forming the lacquer for providing a coating on a substrate, such as NMP. The reaction product is not isolated.

EXAMPLE 8

This example illustrates the preparation of the polymer of the present invention from the polyamic acid oligomer of Formula II where R is an acetylene group and n is 10, and the formation of a coating of this polymer.

The reaction mixture formed in Example 7 is concentrated on a rotary film evaporator to achieve a solids content of about 20%. This lacquer is then spin coated on a substrate as generally described in Example 2. The coated substrate is then heated to about 300° C. for about 30 minutes to cure the polymer and form a coating with good planarization and good solvent resistance.

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein, but is only limited by the following claims.

What is claimed is:

1. A polyimide oligomer capable of forming a polymer having a dielectric constant within the range of about 2.4 to 2.7 and being resistant to ordinary solvents, said oligomer having the formula

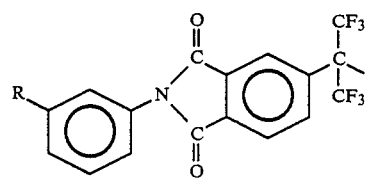

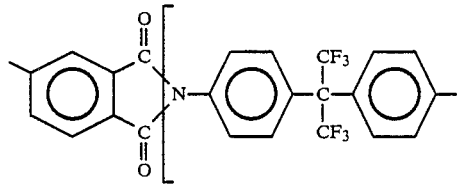

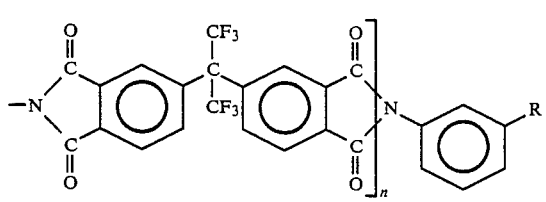

where R is selected from the group consisting of:
—C≡CH,
—CH=CH$_2$,
—CN, and

where R$_1$ is —H or —CH$_3$ and n=1–20.

2. The oligomer of claim 1 wherein n is within the range of 3 to 11.

3. The oligomer of claim 1 wherein R is —C≡CH and n is 10.

4. A polyamic acid oligomer having the formula

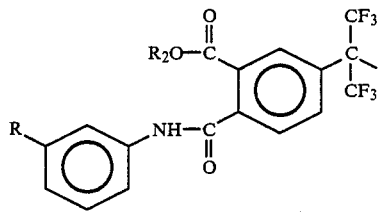

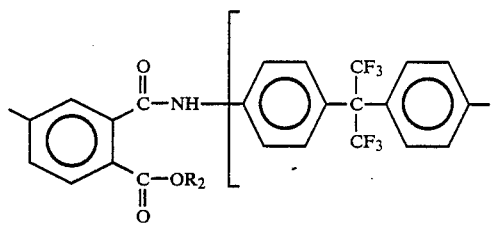

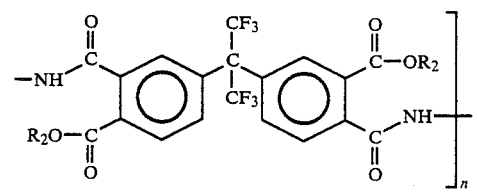

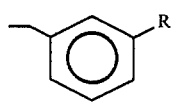

where P0 R is selected from the group consisting of:
—C≡CH,

—CH=CH₂,
—CN, and

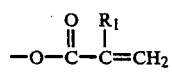

where $R_1$ is —H or —CH₃,
n=2-20, and
$R_2$=—H or a lower alkyl group.

5. The oligomer of claim 4 wherein n is within the range of 3 to 11.

6. The oligomer of claim 4 wherein R is —C≡CH and n is 10.

7. A polymide polymer formed by polymerizing an oligomer having the formula chosen from the group consisting of:

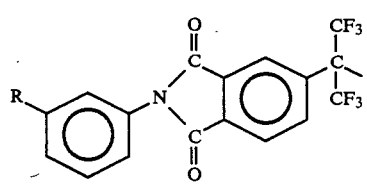

Formula I

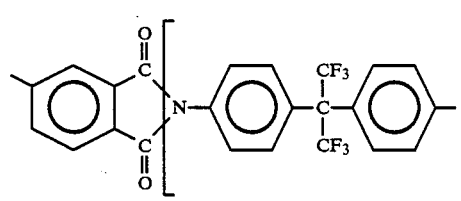

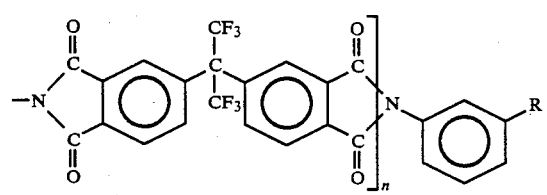

where R is selected from the group consisting of:
—C≡CH,
—CH=CH₂,
—CN, and

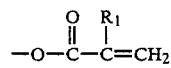

where $R_1$ is —H or —CH₃, and n=2-20, and

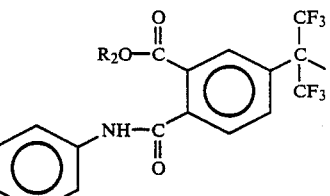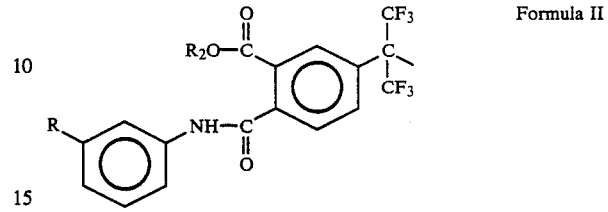

Formula II

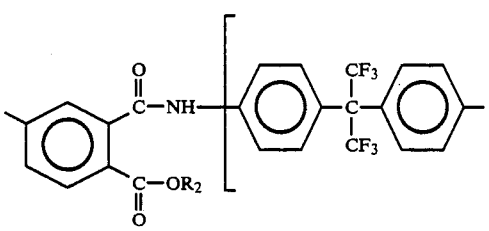

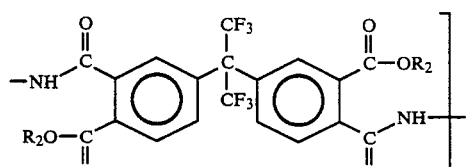

where R, $R_1$ and n are as defined above, $R_2$=—H or a lower alkyl group.

8. The polymer of claim 7 wherein n is within the range of 3 to 11.

9. The polymer of claim 7 wherein R is —C≡CH and n is 10.

10. The polymer of claim 7 wherein said polymerizing comprises heating said oligomer to a temperature within the range of about 200 to 300° C. for about 15 to 60 minutes.

11. The polymer of claim 7 wherein said oligomer having a first selected value of "n" is polymerized with said oligomer having a second selected value of "n".

* * * * *

UNITED STATES PATENT AND TRADEMARK OFFICE
CERTIFICATE OF CORRECTION

PATENT NO. : 4,952,666
DATED : August 28, 1990
INVENTOR(S) : ABRAHAM L. LANDIS

It is certified that error appears in the above-identified patent and that said Letters Patent is hereby corrected as shown below:

Col. 2, line 57, delete "-CδCH" and insert therefor -- -C≡CH --.

Col. 4, line 34, delete "-CδCH" and insert therefor -- -C≡CH --.
      line 42, delete "-or $CH_3$" and insert therefor
          -- -H or $-CH_3$ --; and
          after "=", insert -- 1 --.

Col. 8, line 19, after "N", insert -- -(a hyphen) --;
          after "methyl", insert -- -(a hyphen) --; and
      line 20, delete "pyrolidi none" and insert therefor
          --pyrolidinone--.

Col. 12, line 28, delete "1" and insert therefor --2--; and
      line 67, delete "PO".

Signed and Sealed this

Eighteenth Day of February, 1992

Attest:

HARRY F. MANBECK, JR.

Attesting Officer          Commissioner of Patents and Trademarks